United States Patent
Dye et al.

(10) Patent No.: US 12,493,614 B2
(45) Date of Patent: *Dec. 9, 2025

(54) REAL-TIME DATA VALIDATION USING LAGGING REPLICA DATABASES

(71) Applicant: Amazon Technologies, Inc., Seattle, WA (US)

(72) Inventors: Nathan Dye, Seattle, WA (US); Jacob Adam Gabrielson, Seattle, WA (US); Brian L. Barker, Brier, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/791,252

(22) Filed: Jul. 31, 2024

(65) Prior Publication Data

US 2024/0394245 A1    Nov. 28, 2024

Related U.S. Application Data

(63) Continuation of application No. 17/716,960, filed on Apr. 8, 2022, now Pat. No. 12,079,203, which is a continuation of application No. 16/836,025, filed on Mar. 31, 2020, now Pat. No. 11,301,462.

(51) Int. Cl.
*G06F 16/20* (2019.01)
*G06F 16/23* (2019.01)
*G06F 16/27* (2019.01)

(52) U.S. Cl.
CPC ...... *G06F 16/2379* (2019.01); *G06F 16/2365* (2019.01); *G06F 16/27* (2019.01)

(58) Field of Classification Search
None
See application file for complete search history.

(56) References Cited

U.S. PATENT DOCUMENTS

| | | |
|---|---|---|
| 5,796,999 A | 8/1998 | Azagury et al. |
| 7,702,667 B2 | 4/2010 | Yahalom et al. |
| 8,504,556 B1 | 8/2013 | Rice et al. |
| 10,007,695 B1 | 6/2018 | Baid et al. |
| 10,176,215 B2 | 1/2019 | Eells et al. |
| 2005/0278385 A1 | 12/2005 | Sutela et al. |

(Continued)

OTHER PUBLICATIONS

U.S. Appl. No. 17/716,960, filed Apr. 8, 2022, Nathan Dye et al.

*Primary Examiner* — Jau Shya Meng
(74) *Attorney, Agent, or Firm* — Robert C. Kowert; Kowert, Hood, Munyon, Rankin & Goetzel, P.C.

(57) ABSTRACT

A real-time data validation system prevents problematic updates from being replicated from a primary database to a replica database. The data validation system may inject a time delay into the replication process, so that when an update in a replication stream fails a specified data validation, the data validation system will prevent the update from being applied to the replica. The replication process may be halted to take snapshot of the replica database during the halt, and resumed after the snapshot. Accordingly, if the problematic update is later confirmed to be invalid, the replica database can be rolled back to a point before the problematic update. Advantageously, the disclosed system can be used to implement a variety of data validations on top of a database replication process to protect the replica database from receiving undesired updates.

20 Claims, 11 Drawing Sheets

(56) References Cited

U.S. PATENT DOCUMENTS

| | | |
|---|---|---|
| 2006/0015545 A1 | 1/2006 | Ezra |
| 2007/0186068 A1 | 8/2007 | Agrawal |
| 2011/0066595 A1 | 3/2011 | Kreuder et al. |
| 2017/0123890 A1 | 5/2017 | Haridas et al. |
| 2017/0185488 A1 | 6/2017 | Kumarasamy et al. |
| 2017/0193004 A1 | 7/2017 | Karuppusamy et al. |
| 2018/0101448 A1 | 4/2018 | Ventura et al. |
| 2018/0131765 A1 | 5/2018 | Puleston et al. |
| 2018/0246928 A1 | 8/2018 | Kim et al. |
| 2018/0253702 A1 | 9/2018 | Dowding |
| 2020/0349502 A1 | 11/2020 | Govekar |
| 2021/0141802 A1* | 5/2021 | Labovich .............. G06F 16/273 |

* cited by examiner

Time 1:

Time 2:

Time 3:

REAL-TIME DATA VALIDATION USING LAGGING REPLICA DATABASES

This application is a continuation of U.S. patent application Ser. No. 17/716,960, filed Apr. 8, 2022, which is a continuation of U.S. patent application Ser. No. 16/836,025, filed Mar. 31, 2020, now U.S. Pat. No. 11,301,462, which are hereby incorporated by reference herein in their entirety.

BACKGROUND

Commoditization of computer hardware and software components has led to the rise of cloud-based service providers that provide computation and data storage as services. High throughput and availability demands have driven these services become more distributed on a geographical scale. Different approaches to the replication of data have emerged but at the same time has created significant challenges in the complexity, availability, and performance of enterprise database systems.

In some situations, incoming data to be stored in a company database system must first be filtered or validated. For example, the data may originate form an untrusted source (or a large number of different sources) and the company may wish to implement controls to ensure that only data that meets the company's data quality standards are accepted into the company database. However, current solutions for implementing data quality controls have many shortcomings. For one thing, most data quality solutions are not designed to operate on incoming data in real time. Depending on the length of the validation process, new data may not become available to company users for some time. Out-of-band data validation is also wasteful in that it requires the company to devote large amounts of storage to stage incoming data for long periods of time before the data can be validated. Moreover, current solutions are not readily configurable to allow users to implement a rich set of custom data validations or work with external validators. Often, data validation processes are implemented using a company's own inhouse tools, which are costly to build and maintain. With more companies moving their data into the cloud, there is a growing need for a customizable data validation service to allow customers to implement automated and custom data validations that are enforced in real time.

Figure 1:
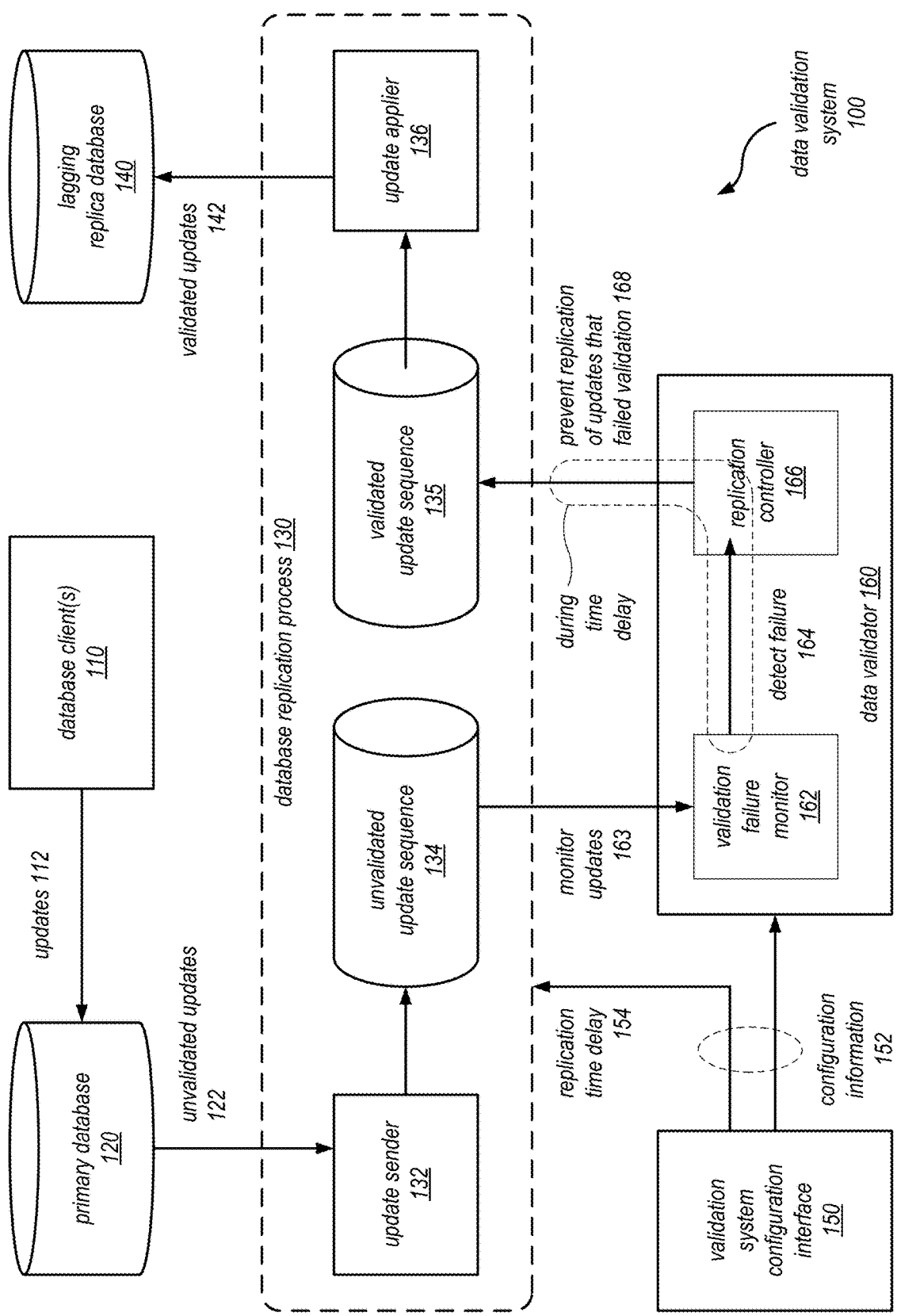
FIG. 1 is a block diagram illustrating an example data validation system that implements real-time data validation using a lagging data replica, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

In many applications, incoming data to a company's internal database must first be filtered or validated before it can be saved in the database. For example, the data may originate form a less trusted source (or a large number of different sources) and the company may wish to implement controls to ensure that the received data that meets the company's data quality standards. However, current solutions for implementing data quality controls have many shortcomings. For one thing, most data quality solutions are not designed to validate incoming data in real time. Depending on the length of the validation process, new data may not become available to company users for some time. Out-of-band data validation is also wasteful in that it requires the company to devote large amounts of storage to stage incoming data for long periods of time before the data can be validated. Moreover, current solutions are not readily configurable to allow users to implement a rich set of custom data validations or work with external validators. Often, data validation processes are implemented using a company's own inhouse tools, which are costly to build and maintain.

Accordingly, systems and methods are described herein, which may be employed in various combinations and in embodiments to implement a data validation or data failure isolation system or service that performs data validation in real time on a database using a lagging replica of the database. The real-time validation system may be implemented based on a data replication process and used to prevent problematic updates in the primary database from being propagated to a replica database. In some embodiments, the data validation system will inject a configured time delay into the replication process, so that when an update in a replication sequence fails a configured data validation, the data validation system will automatically prevent the update from being applied to the replica. In some embodiments, the data validation system may halt replication to stop the update and other subsequent updates from being applied. In some embodiments, the validation system will automatically promote the replica to become the new primary database, so that the problematic update is skipped. In some embodiments, when replication is halted, the system will generate a snapshot of the replica and resume replication on the replica. In this way, if the problematic update is later confirmed to be invalid, the replica can be rolled back to the snapshot (i.e. the point before the problematic update). Embodiments of the disclosed data validation system may be implemented as a data failure isolation system to isolate data corruption or errors to certain databases, and protect other databases from receiving corrupt or erroneous data.

Depending on the embodiment, the data validation and time delay may be implemented at the primary database (e.g. by an update sender component of the replication process), at the replica database (e.g. by an update applier component of the replication process), or by an intermediary component between the primary database and the replica database. In some embodiments, the updates may be recorded at the primary database in the form of a transaction log or journal, which stores the updates that have been performed or committed at the primary database in a sequenced order, and the replication process will apply the updates or transactions in the log or journal onto the replica database. In some embodiments, the replication process may involve the primary database sending change notifications to the replica database, and the replica database downloading changed data objects from the primary in response to the notifications. In such embodiments, the time delay may be implemented as either a delay in sending the change notifications or a delay in downloading the changed objects. In some embodiments, the replication process may be provided by an existing feature of a database system, and the data validation system may be implemented as an adjunct feature within the database system, for example, an intermediate component in the replication path that forwards updates to the replica database. In some embodiments, the data validation system may be a standalone system or service that is distinct from any database system, and the data validation system can be configured to work with many types of database or data storage systems. In some embodiments, the data validation system may be implemented as part of a service provided by a cloud-based service provider, to service customers to design and orchestrate data validation for databases hosted by the service provider. In some embodiments, the data validation system may provide a configuration interface (e.g. a graphical user interface or GUI) that can be used to configure custom data validators between a primary database and a replica database. The configuration interface may allow users to explicitly specify the type of data validation. In some embodiments, the configuration interface may allow users to specify the delay period to use as the replication lag.

In some embodiments, the data validation system may support a variety of data validations, including client-defined validations provided as custom code modules. In some embodiments, the data validation system may also provide a number of pre-defined data validators. One type of validation may implement a "food taster" validation, which validates an update by consuming data that was changed by the update as a simulated client. As another example, a validator may implement a "velocity check" to monitor the amount or rate of data changes that are occurring because of the updates. Excessive data change may indicate a problem with the updates and cause replication to be halted. As another example, a validator may interface with external validation processes (e.g. a validator of a distributed blockchain system) to validate an update. As another example, a validator may perform application-level check on an update (e.g. to determine whether a financial transaction is unauthorized or fraudulent before applying the transaction to a customer account). As another example, a validator may perform a storage-level check on an update (e.g. to check whether the result of an update produces an expected checksum). As will be appreciated by those skilled in the art, a wide variety of data validations are possible in addition to the exampled discussed here.

In some embodiments, the delay period or the replica lag may simply be the time it takes for the data validator to complete data validation. In some embodiments, this delay period may not be something that is configurable by the user. In some embodiments, the delay period may be configurable, and specified as a static value (e.g. as the maximum time it takes for the validation process to complete). In this way, a problematic update can be detected and halted in time, before expiration of the time delay period, to prevent the update from being applied to the secondary or replica database. In some embodiments, a data validator may be configured to dynamically adjust the delay time period based on runtime conditions or metrics. For example, in some embodiments, the data validator may monitor a validation time metric that approximates how long the validation process is taking for recent updates, and adjust the delay period based on the validation time metric. In some embodiments, the data validator may monitor the size of an update buffer that is storing updates to be validated, and shorten the delay period when there is a large backlog of pending updates. In this manner, the validation system is able to perform some degree of self-management to adapt the length of the replica lag to various runtime conditions without human monitoring.

In some embodiments, the data validation system may generate a snapshot of the replica database for each halt of replication. The snapshot may be generated during the halt so that it captures a state of the replica database before the problematic update is applied. Once the snapshot is taken, the replication process may resume on the replica database. If the problematic update is later confirmed to be invalid, the replica database can be rolled back to the snapshot, to a state before the problematic update. In this manner, the data validation system only has to stop the replication briefly for each suspicious update, in order to generate the snapshot. In some embodiments, the snapshots may be generated into a managed storage area, where older or less useful snapshots are deleted in favor of new ones when a limit on storage space (or some other configured limit) is exceeded. This automatic removal of the snapshots allows the system to intelligently maintain a limited set of checkpoints of a database taken at appropriate times before questionable updates, without significant manual interventions from the user.

Advantageously, the disclosed data validation or data failure isolation system can be used to implement a variety of custom data validations on top of or within a database replication process to protect the replica database from receiving invalid updates. Data validators can be implemented on database replication links between a variety of database systems to implement validation points on the data flow among the database systems. The configured data validations may be enforced in real time and easily managed via the configuration interface of the system. These and other features and benefits of the data validation system are described in further detail below, in connection with the figures.

FIG. 1 is a block diagram illustrating an example data validation system that implements real-time data validation using a lagging data replica, according to some embodiments.

As shown, in some embodiments, the data validation or data failure isolation system 100 may be implemented as part of a database replication process 130. The database replication process 130 may be implemented as a feature of an existing database management system that replicates one database (e.g. primary database 120) to a replica database (e.g. lagging replica database 140). In some embodiments, the two databases 120 and 140 may be remote from each other, for example, in two different geographic locations, regions, security zones, or networks.

In other embodiments, the database replication process 130 may not be implemented by the database system. Rather, the replication process may be implemented by the data validation system 100 itself. In some embodiments, the primary database 120 and the replica database 140 may be managed by two different types of database management systems. Accordingly, in some embodiments, the replication database 140 may not represent an exact replica of the primary database 120. Depending on the embodiment, the primary and replica databases may be implemented as different types of databases such as relational databases, no-SQL databases, key-value databases, object databases, in-memory databases, partitioned databases, and the like. In some embodiments, instead of a primary database 120 or a replica database 140, the source and/or destination of the replication process may be a type of a dataset, such as a log file, a journal, a file system, or the like.

As shown in this example, the primary database 120 is configured to receive updates 112 from one or more database clients 110. As a result of these updates, the primary database may generate unvalidated updates 122 that was performed on the primary database, which is received by an update sender component 132. The update sender 132 will send a sequence of the unvalidated updates in an unvalidated update sequence 134. The unvalidated update sequence 134 will be monitored by a data validator component 160 implemented by the data validation system, which will generate a validated update sequence 135 to an update applier 136 to be applied to the replica database 140. In some embodiments, the updates 112, 122, and 142 may be represented in the same form (e.g. user-level commands or write statements to the database). In some embodiments, the updates may be lower-level (e.g. storage level changes on individual data blocks). In some embodiments, the updates may be transactions of multiple write operations that are semantically understood to occur atomically in the database.

The transmission of the unvalidated update sequence 134 and/or validated update sequence 135 may occur over one or more networks, including private network local networks or wide-area or public networks. In some embodiments, the sending of the update sequences 134 and 135 may maintain the sequential order of the updates. The update sender 132 and data validator 160 may perform the work of interfacing with the data transmission network to package, format, compress, and/or encrypt the update sequences and marshal the updates onto the network. In some embodiments, the update sequence 134 may be sent as an update stream that continuously provides any updates made or committed to the primary database 120. In some embodiments, the data validator 160 and update applier 136 may be configured to receive the update sequences from the network. In particular, the update applier 136 will apply the validated update sequence 135 in sequential order to the replica database 140.

In some embodiments, the unvalidated update sequence 134, validated update sequence 135, or both may be encoded so that they cannot be temper without being detected. For example, the updates in the sequence(s) may by cryptographically encoded with a hash or key derived from previous updates, so that any missing update in the sequence will be reflected in a mismatch in the hash or keys of later updates. In some embodiments, the validator 160 may be responsible for creating this cryptographic encoding for validated updates, so that the validated update sequence 135 is made temper-proof.

It is noted that while not shown in this figure, in some embodiments, the data validator 160 may not be implemented in the middle of the update sequences 134 and 135. Rather, in some embodiments, the replication process 130 may simply implement a single update sequence that is directly transmitted from the update sender 132 to the update applier 136. In such embodiments, the data validator 160 may be implemented outside of the replication process, to monitor and control the replication process as an outsider component.

The details of the database replication process 130 may vary from embodiment to embodiment. For example, in some embodiments, the replication process 130 may be implemented by two database instances of the same type, and the update sender 132 and update applier 136 are part of the database replication subsystem designed to work with one another. In some embodiments, the primary and replica databases may be different types of databases, and the update sender and update applier are not part of the same database management system. Rather, the update sender and update applier may both adhere to a data replication protocol. For example, in one type of replication protocol, the update sender may first broadcast that portions of the primary database (e.g. particular objects or items in the database) have been updated. The update applier will receive the notification after validation by the data validator 160, and in response pull or download the changed data objects or items from the primary database. This type of protocol avoids the indiscriminate sharing of all updates to the primary database, and allows the update applier to selectively obtain the data it wishes to replicate in the replica database. In some embodiments, the database validation system or data validator 160 may be a standalone system that is distinct from the primary database and the replica database, and the database replication process 130 is implemented by the data validation system on top of the database management system.

As shown, the data validation system 100 in this example implements a validation system configuration interface 150.

Depending on the embodiment, the configuration interface may be a user-interactive interface (e.g. a GUI or command line interface) or a programmatic interface (e.g. a web service interface or application programming interface (API)). The configuration interface will allow a user or other computer processes to control various operational settings of the data validation system. In some embodiments, the configuration interface may allow a user to define a particular data validator 160 to be injected into or implemented on top of the database replication process 130. The configuration information 152 will specify the behavior of the data validator 160, as well as replication time delay 154 for the replication process 130. However, in some embodiments, the time delay 154 may not be an explicitly configured parameter of the data validation process. Rather, the time delay 154 may an implicitly parameter that is not configurable, and simply reflect the time that is used by the data validator 160 to perform the data validation.

In some embodiments, the replication time delay 154 represent a configured time delay that is guaranteed by the replication process, so that any individual update that is placed into the replication process (e.g. the update sequence 134) will not be applied to the replica database 140 for the duration of that delay. Depending on the embodiment, this delay may be implemented at the update sender 132, the update applier 136, or the data validator 160. In embodiments where the replication process involves a multi-message conversation between the update sender 132 and update applier 136, the delay may be implemented for any message in the protocol. As may be understood, the time delay will cause the replica database 140 to lag the primary database 120, so that at any given time, some amount of updates that have been committed to the primary database will not yet be present in the replica database. This delay provides a time window for the data validator 160 to examine individual updates in the sequence 134, and stop the replication process if an invalid or questionable update is detected. In some embodiments, the replication time delay 154 may be an explicit value that is provided as part of the configuration information 152, and may remain static during the replication process. In other embodiments, the replication time delay 154 may be controlled dynamically so that the length of the time delay can vary based on runtime conditions. In some embodiments, the dynamic adjustment of the time delay 154 is controlled by one or more configuration settings, rules, formulas, or policies.

As shown, the configuration information 152 may also define the operations of a data validator 160. The data validator 160 may be implemented as a component within the update sender 132 or update applier 136. In some embodiments, the validator 160 may be executed as an independent component or process. In embodiments where the data validation system 100 is implemented as a service provided by a cloud-based service provider, the data validator 160 may be implemented on one or more compute nodes (e.g. a virtual machines) provisioned by the cloud-based service provider. In some embodiments, a pool of multiple compute nodes may be used to implement the validator 160, and the size of the pool may be automatically scaled based on the amount of traffic seen in the replication process.

As shown, the data validator 160 implements a validation failure monitor component 162 and a replication controller component 166. The validation failure monitor component 162 is configured to monitor 163 the update stream 134 for a particular type of data validation failure specified in the configuration information 152. When an update that fails the validation specified for the data validator, the monitoring component 162 will trigger the replication controller 166 to prevent 168 the replication process 130 from applying updates that failed validation. For example, the replication process 130 may remove updates that fail validation, so that any invalid updates will not be included in the validated update sequence 135. As another example, the replication process may halt or stop the replication process so that the invalid update and subsequent updates in the sequence 134 are not applied to the replica. In some embodiments, the replication controller 166 is able to interact with the database system(s) to control the replication process (e.g. via an API or service interface). Depending on the embodiment, the replication controller may be used to perform control operations such as stopping or resuming the replication process, removing or transforming updates, creating new replicas, replacing the primary database with its replica, or even generating snapshots of the replica, etc.

As shown, the detection 164 of the validation failure and the prevention 168 of the application of updates will both occur within the replication time delay 154. As a result, the problematic update that failed validation can be stopped in time before it is applied to the replica. In this manner, the disclosed data validation system 100 is able to protect the replica database 140 and only allow validate updates 142 to be applied to the replica database. The system is able to implement many different types of data validations on top of or within the replication process, and by using a lagging replica database, the validations can be performed substantially in real time.

Figure 2:
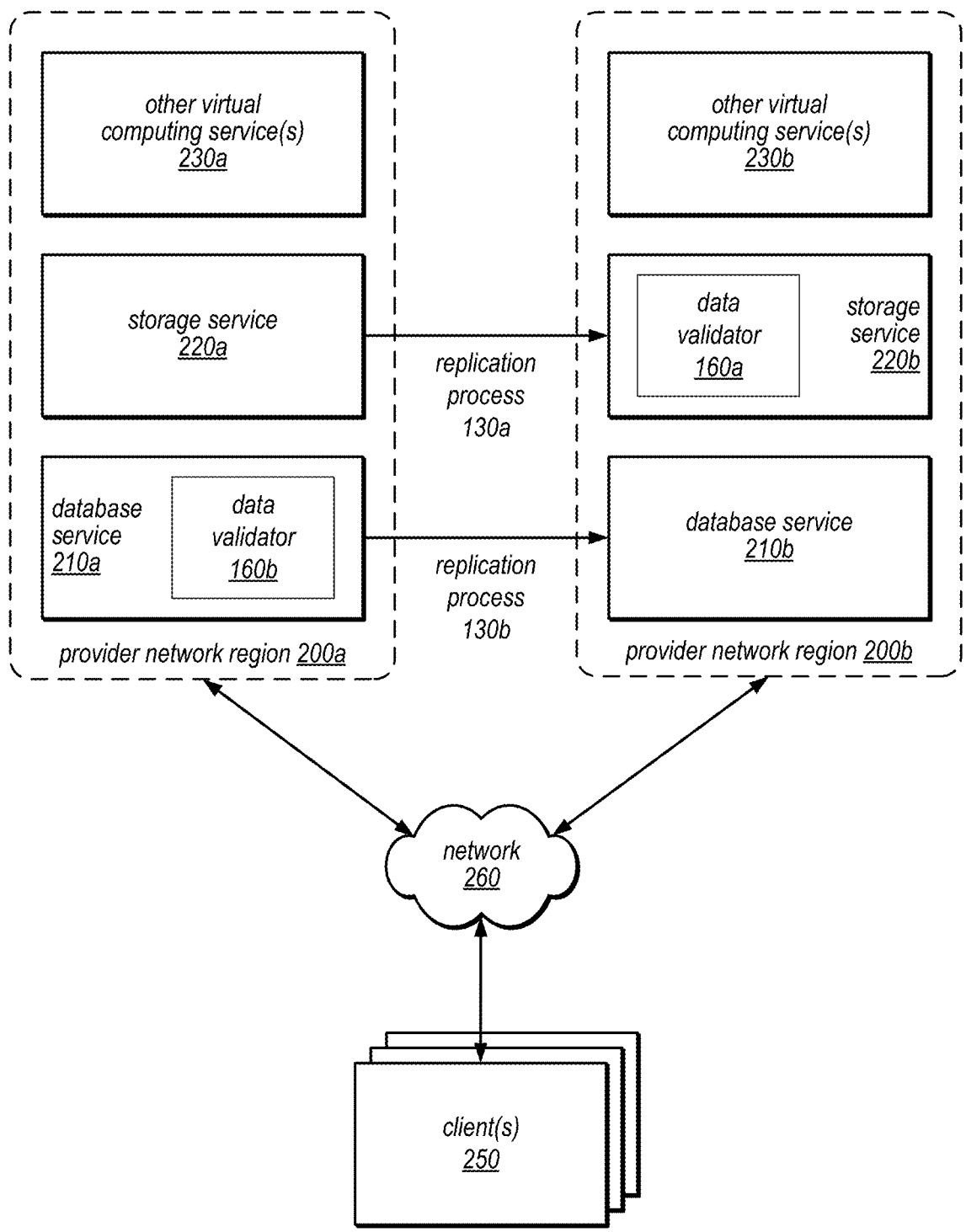
FIG. 2 is a block diagram illustrating a database service and a storage service in multiple provider network regions that implement data validation systems using lagging data replicas, according to some embodiments.

FIG. 2 is a block diagram illustrating a database service and a storage service in multiple provider network regions that implement data validation systems using lagging data replicas, according to some embodiments.

In some embodiments, a provider network may be a private or closed system or may be set up by an entity such as a company or a public sector organization to provide one or more services (such as various types of cloud-based storage) accessible via the Internet and/or other networks to clients 250, in some embodiments. The provider network may be implemented in a single location or may include numerous provider network regions, such as provider network regions 200a, 200b, and so on, that may include one or more data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network within the provider network regions 200. Provider network regions 200 may, in some embodiments, be isolated from other provider network regions. In the illustrated embodiment, a number of clients (shown as clients 250 may interact with a provider network region 200 via a network 260. Provider network regions 200 may implement respective instantiations of the same (or different) services, a database services 210a and 210b, a storage services 220a and 220b and/or one or more other virtual computing services 230a and 230b. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to provider network region 200 via network 260, including requests for database services. For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with network-based services platform 200. In some embodiments, client 250 may generate network-based services requests according to a Representational State Transfer (REST)-style web services architecture, a document- or message-based network-based services architecture, or another suitable network-based services architecture.

In some embodiments, a client 250 (e.g., a database service client) may be may provide access to network-based storage of database tables to other applications in a manner that is transparent to those applications. For example, client 250 may be may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to provider network region 200 may be coordinated by client 250 and the operating system or file system on behalf of applications executing within the operating system environment.

Clients 250 may convey network-based services requests to and receive responses from provider network region 200 via network 260. In various embodiments, network 260 may encompass any suitable combination of networking hardware and protocols necessary to establish network-based communications between clients 250 and network-based platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network region 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with provider network region 200 using a private network rather than the public Internet. For example, clients 250 may be provisioned within the same enterprise as a database service system (e.g., a system that implements database service 210 and/or storage service 220). In such a case, clients 250 may communicate with platform 200 entirely through a private network 260 (e.g., a LAN or WAN that may use Internet-based communication protocols but which is not publicly accessible).

Generally speaking, provider network region 200 may implement one or more service endpoints may receive and process network-based services requests, such as requests to access data pages (or records thereof). For example, provider network region 200 may include hardware and/or software may implement a particular endpoint, such that an HTTP-based network-based services request directed to that endpoint is properly received and processed. In one embodiment, provider network region 200 may be implemented as a server system may receive network-based services requests from clients 250 and to forward them to components of a system that implements database service 210, storage service 220 and/or another virtual computing service 230 for processing. In other embodiments, provider network region 200 may be configured as a number of distinct systems (e.g., in a cluster topology) implementing load balancing and other request management features may dynamically manage large-scale network-based services request processing loads. In various embodiments, provider network region 200 may be may support REST-style or document-based (e.g., SOAP-based) types of network-based services requests. In some embodiments, the database system 100 of FIG. 1 may be implemented by the database service 210 shown here. In some embodiments, the primary volume 120 and mirror volume 130 of FIG. 1 may be implemented by the storage service 220 shown here.

In addition to functioning as an addressable endpoint for clients' network-based services requests, in some embodiments, provider network region 200 may implement various client management features. For example, provider network region 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Provider network region 200 may also implement financial accounting and billing systems, or may maintain a database of usage data that may be queried and processed by external systems for reporting and billing of client usage activity. In certain embodiments, provider network region 200 may collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another virtual computing service 230 (or the underlying systems that implement those services).

In some embodiments, provider network region 200 may also implement user authentication and access control procedures. For example, for a given network-based services request to access a particular database table, provider network region 200 ascertain whether the client 250 associated with the request is authorized to access the particular database table. Provider network region 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, platform 200 may reject the corresponding network-based services request, for example by returning a response to the requesting client 250 indicating an error condition. Various access control policies may be stored as records or lists of access control information by database service 210, storage service 220 and/or other virtual computing services 230.

As shown in this example, two replications processes 130*a* and 130*b* are used to implement to different data validators 160*a* and 160*b*. Validator 160*a* is implemented for the storage service 220. Thus, the updates that it is validating may be storage-level operations (e.g. writing of data blocks, objects, files, etc.). As shown, validator 160*a* is implemented on the destination side of the replication process 130*a*. Thus, this validator may implement a time delay for applying updates to the destination storage service 220*b*. In some embodiments, where the update applier actively downloads changed objects or items from the data source, the update applier may implement the delay as part of the downloading process. As shown, validator 160*b* is implemented for a database service 210. Thus, the updates that this validator is validating may include database updates (e.g. updates to rows in a database table). Validator 160*b* is implemented on the source side of the replication process 130*b*. Thus, this validator may implement a time delay for sending updates to the cross-region replica. In some embodiments, the time delays may be implemented at both the source and destination, or at some intermediary component distinct from both the source or destination data stores. As may be appreciated by those skilled in the art, other implementations of the data validation system are also possible. As just one example, the provide network may implement an embodiment of the data validation system as a standalone service that operates independently from the storage service 220 and the database service 210, but can be configured to work with both these services to perform real-time data validation.

Figure 3:
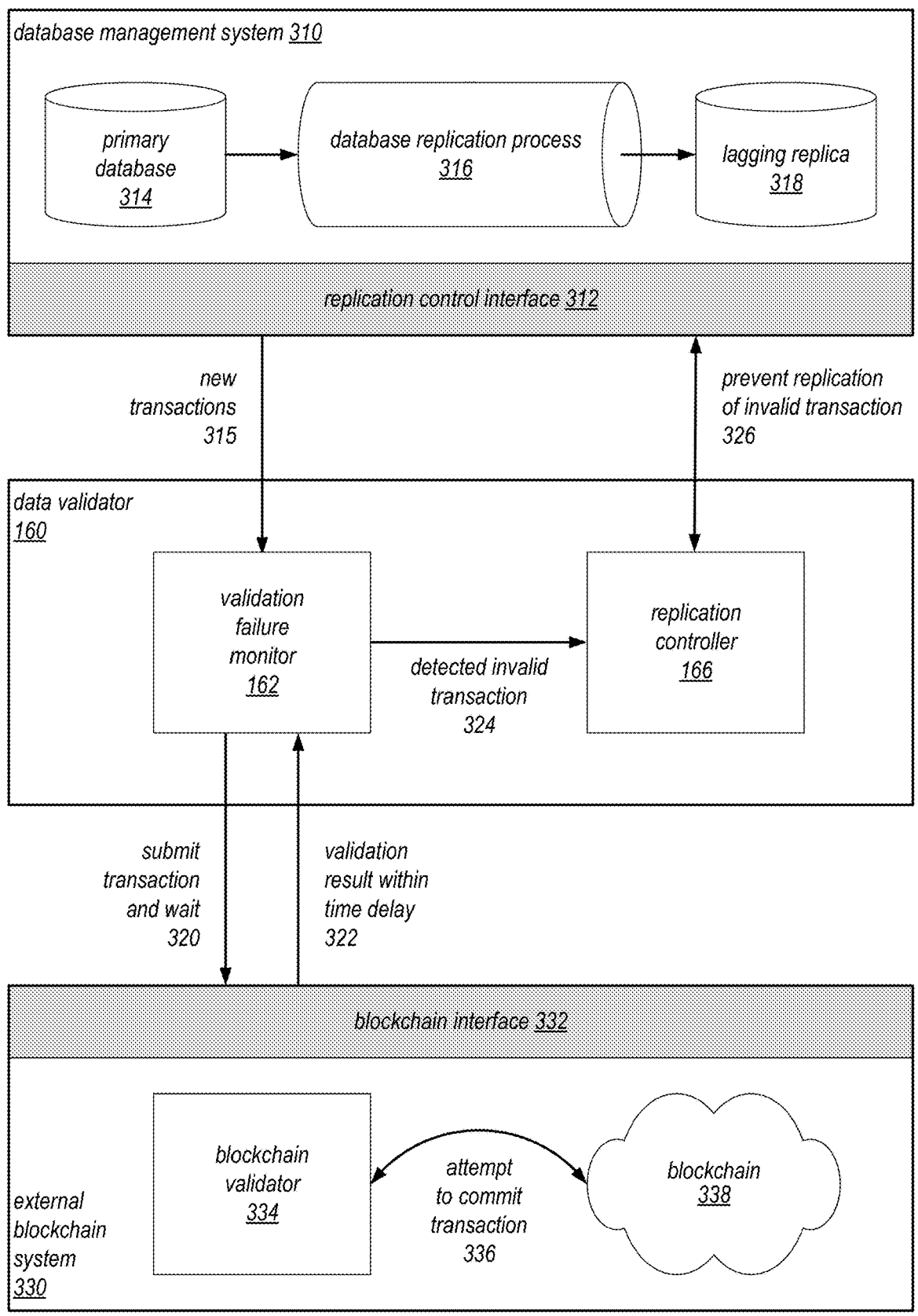
FIG. 3 is a block diagram illustrating a data validation system that employs a data validator to interface with an external blockchain system, according to some embodiments.

FIG. 3 is a block diagram illustrating a data validation system that employs a data validator to interface with an external blockchain system, according to some embodiments.

As shown, the figure depicts an embodiment of the data validator 160, as discussed in connection with FIG. 1. In this example, the data validator 160 is monitoring transactions 315 that have been performed on primary database 314, which replicated by the replication process 316 to a lagging replica 318. As shown, the primary database 314, lagging replica 318, and database replication process 316 are all managed by the same database management system 310. The database management system 310 provides a replication control interface 312 to allow outside users or software processes to control the replication process 316. In some embodiments, the replication control interface 312 may provide to registered listeners the stream of new transactions that is being replicated. The same stream may also be sent to the lagging replica. In some embodiments, the replication control interface 312 may allow external control components (e.g. the data validation 160 in this case) to control the replication process 316, for example, to stop or restart the replication process. As shown, the data validator 160 in this example is external to the database management system 310. As discussed, in some embodiments, the validation functionality may be implemented by the data validation system, which may be a distinct system or service from the database management system.

As shown, the validator 160 monitors for validation failures by submitting individual transactions to an external blockchain system 332. The external blockchain system may be a system that maintains a blockchain 338 and validates and adds transactions to the blockchain. In some embodiments, the blockchain 338 may capture movements of a type of coin or token among holder accounts, so as to maintain a global ledger for all coins or tokens tracked by the system. In some embodiments, the validation performed by the blockchain system (e.g. by the blockchain validator 334) may check that each new transaction associated with a coin or token is not a "double spend" (e.g. has not been previously moved from the sender account). The transaction can only be added to the blockchain 338 if this validation succeeds. In some embodiments, the blockchain 338 may be maintained in a decentralized fashion across a large number of independent computers, and the blockchain validator 334 is one of a large number of independent blockchain validators in the network. As just one example, the external blockchain system 330 may be used to maintain the ledger for the BITCOIN cryptocurrency.

As shown, when individual transactions are submitted to the blockchain system via its blockchain interface 332, the blockchain validator 334 will attempt 336 to commit the transaction to the blockchain 338. As discussed, this attempt 336 will require the blockchain validator 334 to validate the transaction (e.g. to verify that the transaction is not a double spend based on the current state of the blockchain 338). When the validation succeeds and the transaction is accepted into the blockchain, the blockchain system 330 may report the validation result 322 back to the data validator 160. In some embodiments, the blockchain interface 332 may not actually report a validation result 322, and it is up to the data validator 160 to periodically check that the transaction has been validated and accepted by the blockchain system 330.

As shown, the data validator 160 may wait 320 for the validation result 322 for period of time, which may be set to the replication time delay 154 of the replication process. In some embodiments, if no validation results are received during this time delay (e.g. the blockchain system does not indicate acceptance within the time delay), this condition will be deemed a detection 324 of validation failure at the validator 160, and the validation failure will prevent 326 the replication process from replication the invalid transaction to the replica database. Thus, the time delay in this example is set to be the maximum time to wait for the validation result 322 from an external system, here the blockchain system 330. In some embodiments, the length of the time delay may be automatically adjusted by the data validator based on recently observed response times or conditions of the blockchain system.

In some embodiments, when a transaction fails to validate in this example, the replication process 316 at the database system will be halted during the time delay, in time to prevent the offending transaction from being applied to the replica database 318. Moreover, in some embodiments, the replication controller 166 may also perform a recovery process after the halting of replication. For example, in some embodiments, the replication controller 166 may generate a notification or alert to one or more administrators. In some embodiments, the controller 166 may invoke one or more additional software components to perform further analysis or examination of the invalid transactions, in order to confirm that it is invalid. In some embodiments, the replication controller may simply skip over the problematic transaction. That is, the remaining transactions in the replication process 316 will be flushed to the replica (subject to further validation checks), and the replica 318 will be promoted to replace the primary database 314. In some embodiments, the replication controller 166 may then initiate a new replication process for the new primary database. In this manner, the entire process can be fully automated to continuously exclude invalid transactions from an instance of the replica database, which will be guaranteed to only include validated transactions.

Figure 4:
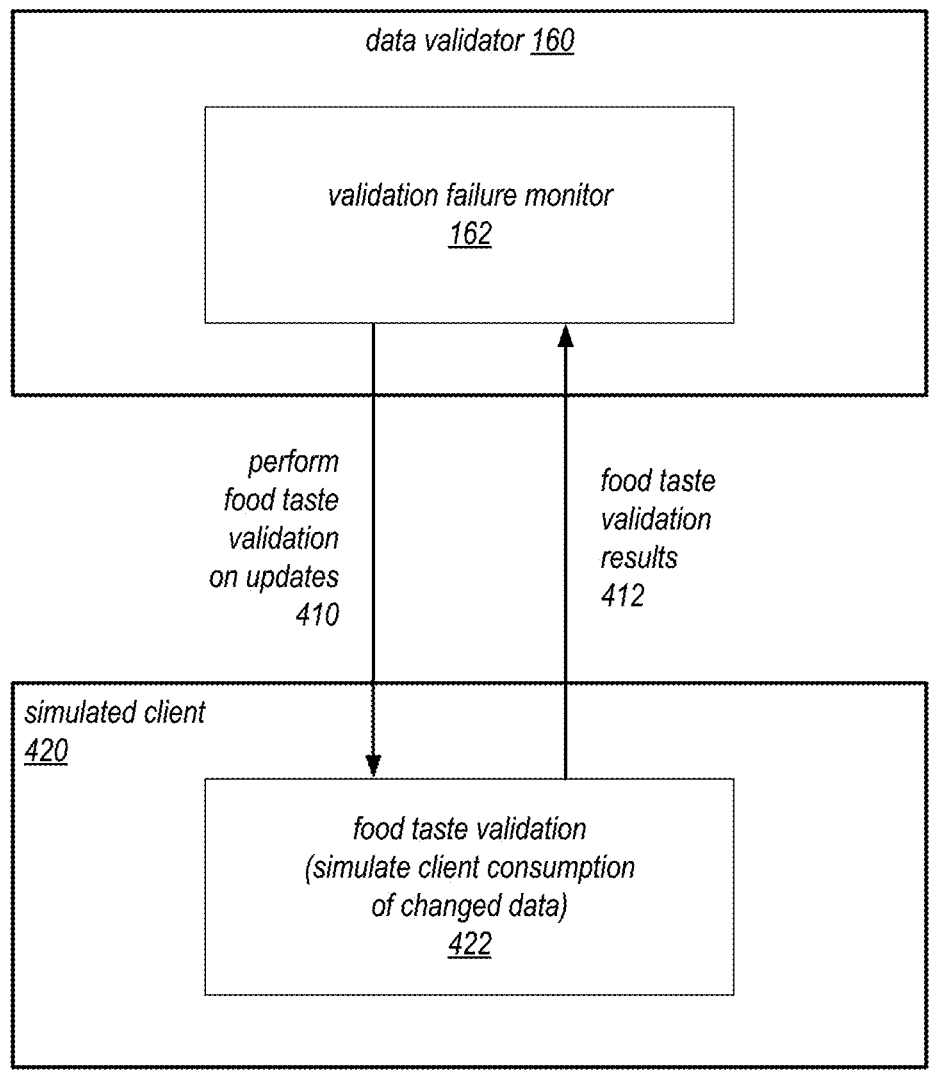
FIG. 4 is a block diagram illustrating a data validator that validates updates using a simulated client, according to some embodiments.

FIG. 4 is a block diagram illustrating a data validator that validates updates using a simulated client, according to some embodiments.

As shown in this figure, an embodiment of the data validator 160 monitors for validation failures by using a simulated client 420. In some embodiments, the simulated client may be implemented as part of the data validator 160 (e.g., as part of the same process or on a same computing node). In other embodiments, the simulated client may be an actual client that is invoked 410 by the data validator 160 consume the changed data for validation purposes. The validation performed in this manner may be referred to as a "food taste" validation 422, because the simulated client 410 uses or consumes the data changed by the update to test the validity of the data.

In some embodiments, the food test validation may be performed inline, on the update sequence of the replication process in transit from the primary database to the replica. In some embodiments, the simulated client may access the changed data from the primary database to consume the data. In other embodiments, the simulated usage may obtain the data in other ways (e.g. from the data validator 160). If the changed data can be used or consumed as expected, the food taste validation is deemed a success. However, if the data cannot be used or consumed as expected by the simulated client, the validation is considered a failure. The validation results 412 may be returned to data validator 160, which used the results to determine whether replication should be halted, as discussed in connection with FIG. 1.

As just one example of this type of validation, a change to a domain name may be validated in this manner by attempting to resolve an Internet Protocol (IP) address for the domain name against a Domain Name Service (DNS), which may store the domain name in a table in the primary database. If the IP address does not resolve to a matching domain name, then the change to the new domain name fails the food taste validation. This measure may be employed to ensure that routine updates to these types of data are free of error before the updates are accepted for use by actual consumers.

Figure 5:
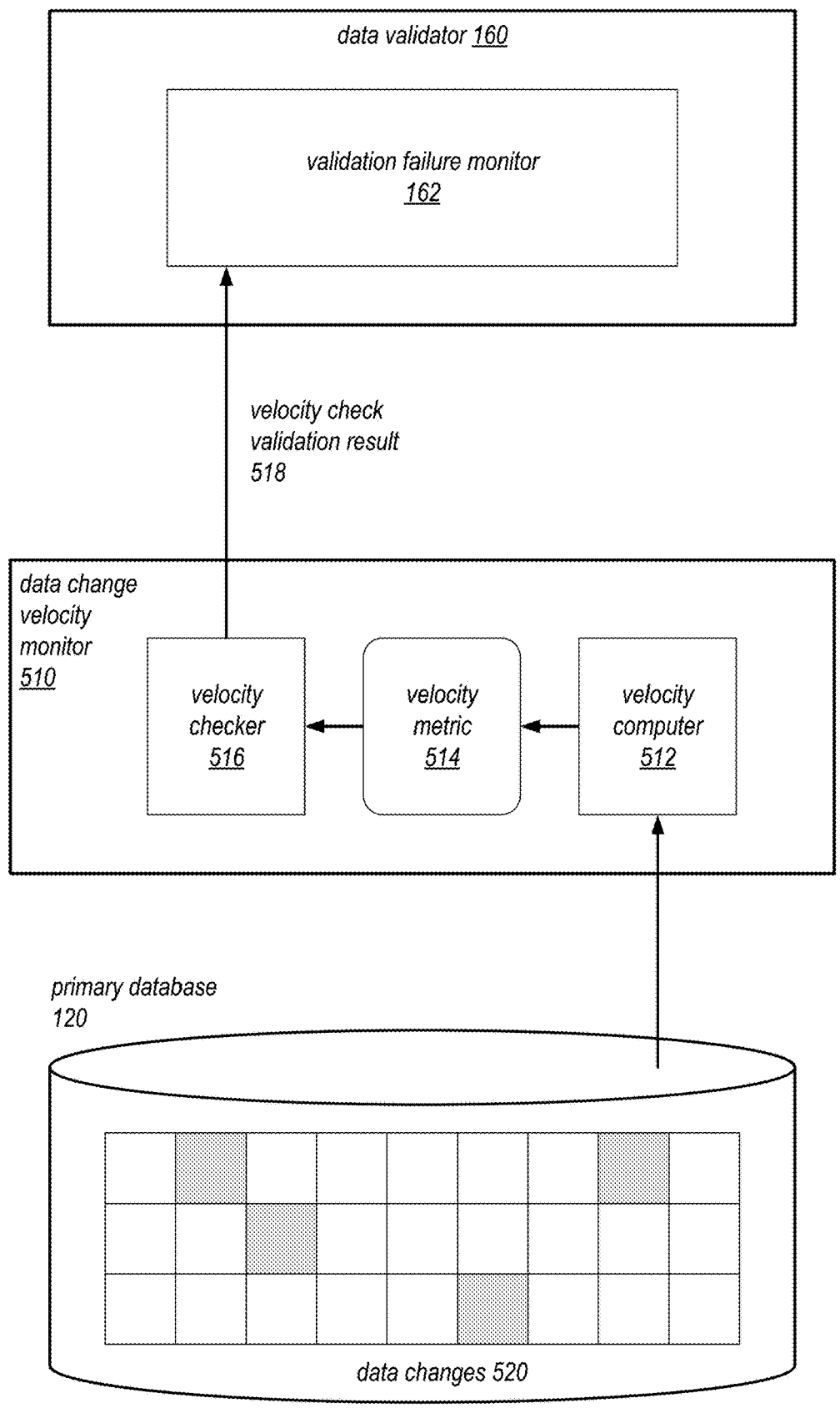
FIG. 5 is a block diagram illustrating a data validator that validates updates by tracking the change velocity of the data being updated, according to some embodiments.

FIG. 5 is a block diagram illustrating a data validator that validates updates by tracking the change velocity of the data being updated, according to some embodiments.

As shown in FIG. 5, an embodiment of the data validator 160 monitors for validation failures by using a data change velocity monitor 510. In some embodiments, the velocity monitor may be implemented as part of the data validator 160 (e.g., as part of the same process or on a same computing node). In other embodiments, the velocity monitor may be a separate component that is interacts with the data validator 160 during validation. For example, the velocity monitor may continuously push velocity check validation results 518 (e.g. as a velocity metric) to the data validator, and the data validator will monitor this result or metric to control the data replication.

As shown, in some embodiments, the velocity monitor 510 may monitor for data changes 520 in the data being updated (here in the primary database 120), and use a velocity computer component 512 to compute a velocity metric 514. The velocity metric 514 may indicate the amount or rate of changes 520 in the data. In some embodiments, when the data changes drastically in a short amount of time, this may indicate a suspicious sequence of updates on the data or an erroneous condition amounting to a validation error. For example, if it is detected that a large number of user passwords have changed within 24 hours, this may constitute a validation failure and cause all further password updates to be halted. The velocity check 516 may be programmed or configured to evaluate the velocity metric to determine these types of conditions, and report validation results 518 to the data validator. In some embodiments, the validation results may be reported regularly on an ongoing basis. In some embodiments, at least some components of the velocity monitor 510 may be implemented by a database management system that is managing the primary database. In some embodiments, the velocity metric may be determined by observing the update stream managed by the data replication process, instead of data in the primary database.

Figure 6:
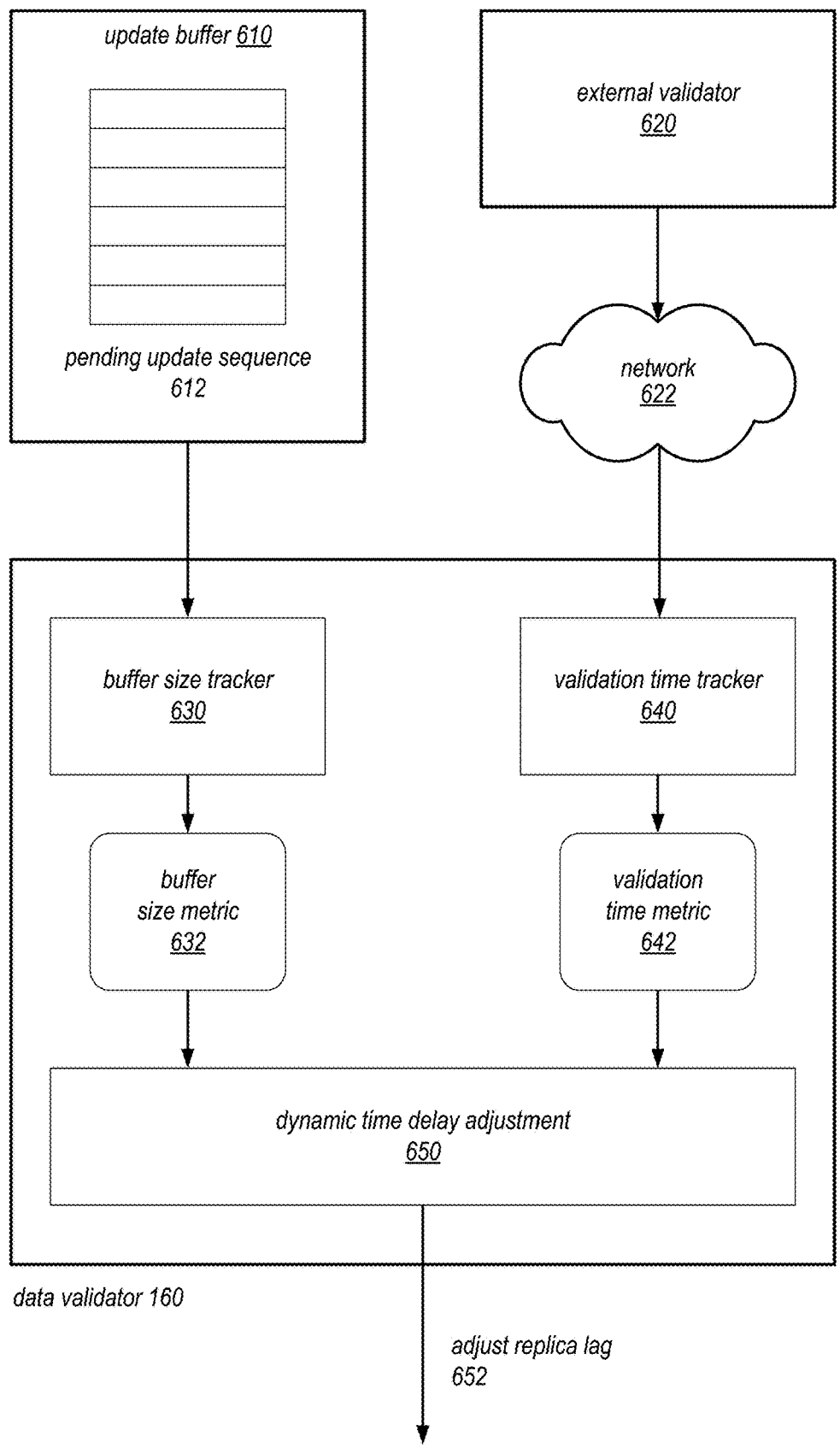
FIG. 6 is a block diagram illustrating a data validator that dynamically adjust the time delay for the lagging replica, according to some embodiments.

FIG. 6 is a block diagram illustrating a data validator that dynamically adjust the time delay for the lagging replica, according to some embodiments.

As shown in this example, the data validator 160 is tracking two different metrics over time to dynamically adjust the time delay of the lagging replica (e.g. time delay 154): a buffer size metric 632 and a validation time metric 642. The buffer size metric 632 may be tracked by a buffer size tracker 630, and reflects an amount of pending updates 612 in an update buffer 610 awaiting validation. Depending on the embodiment, the buffer 610 may be maintained as part of data replication process, the data validator 160, or some other component. The buffer size metric may indicate how heavily the buffer is being utilized, which indicates how much updates are occurring at the primary database. As some examples, the buffer size metric may indicate the number of updates currently in the buffer (or in a previous time window), the number of updates entering and exiting the buffer, the amount of storage space used in the buffer (e.g. in terms of bytes), the amount of data (in terms of bytes) entering and exiting the buffer, the rate of change of updates in the buffer, and/or the predicted number of updates or used storage in the buffer for a next time period. In some embodiments, multiple buffer size metrics may be used in combination.

The buffer size metrics may then be used by the dynamic delay time adjustment component 650 to dynamically adjust 652 the time delay to apply updates to the replica. In some embodiments, the dynamic adjustments may be configurable and controlled according to user-specified policies, rules, or settings. In some embodiments, as the buffer size metric grows large (e.g. the larger the replication backlog), the adjustment component 650 will progressively reduce the time delay (e.g. causing updates to be replicated faster). This policy thus mitigates conditions that may lead to a large gap between primary database and replica database. In some embodiments, in conjunction to reducing the time delay, the data validation system may also increase the number of validators in an autoscaling mechanism to meet the increased demand for validation.

As shown, the validation time metric 642 may be tracked by a validation time tracker 640, and indicate an amount of time taken for an external validator to complete validation. For example, the external validator 620 may be remote from the data validator 160, and communicate with the data validator 160 over a network 622. In some embodiments, the data validator 160 may have little control over the operations of the external validator and how quickly the external validator can complete validations. For example, in the case of the blockchain example in FIG. 3, the data validator may have little control over the confirmation times of the blockchain system, which can vary based on the number of transactions in the network and the number of blockchain validators. Accordingly, the validation time tracker 640 will track the validation time exhibited by the external validator 620, and adjust the time delay (e.g. the amount of time to wait for validation results from the external validator) accordingly. For example, the validation time metric may indicate information such as an average time to receive validation in a last time period, the trend or rate of change in the validation time, or some other measure of the validation time or the external validator's load condition. In some embodiments, the dynamic time delay adjustor will increase the time delay for larger values of the validation time metric. Again, this aspect of the dynamic adjustment may be configurable and controlled by user-specified policies, rules, or settings. As will be appreciated by those skilled in the art, other types of metrics or conditions may also be used to dynamically adjust the time delay for the replica, in addition to the two examples discussed here.

Figure 7:
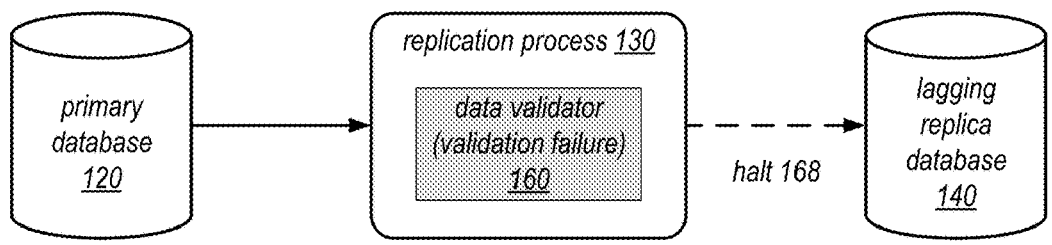
FIG. 7 illustrates a process of generating and managing snapshots of the lagging replica in a data validation system that validates data using the lagging replica.
Figure 7:
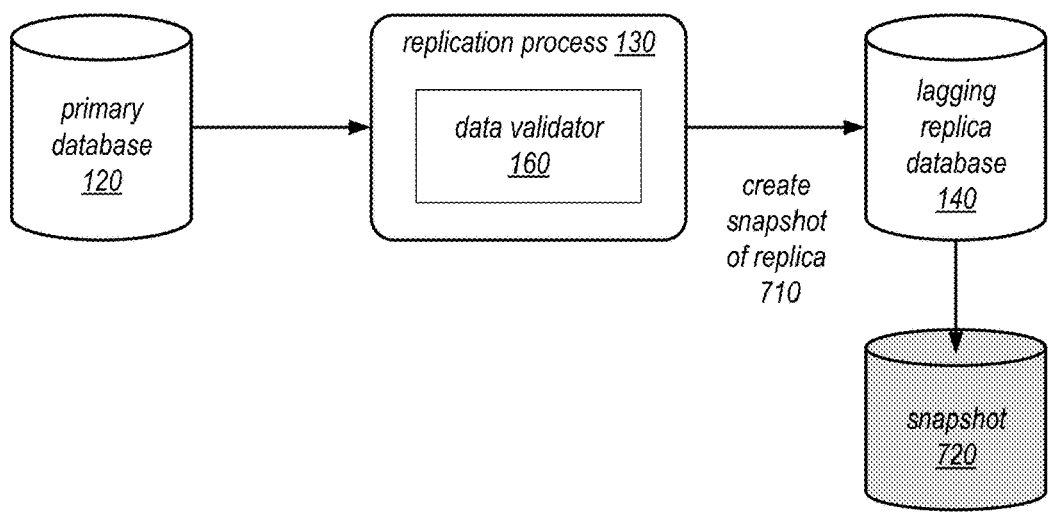
Figure 7:
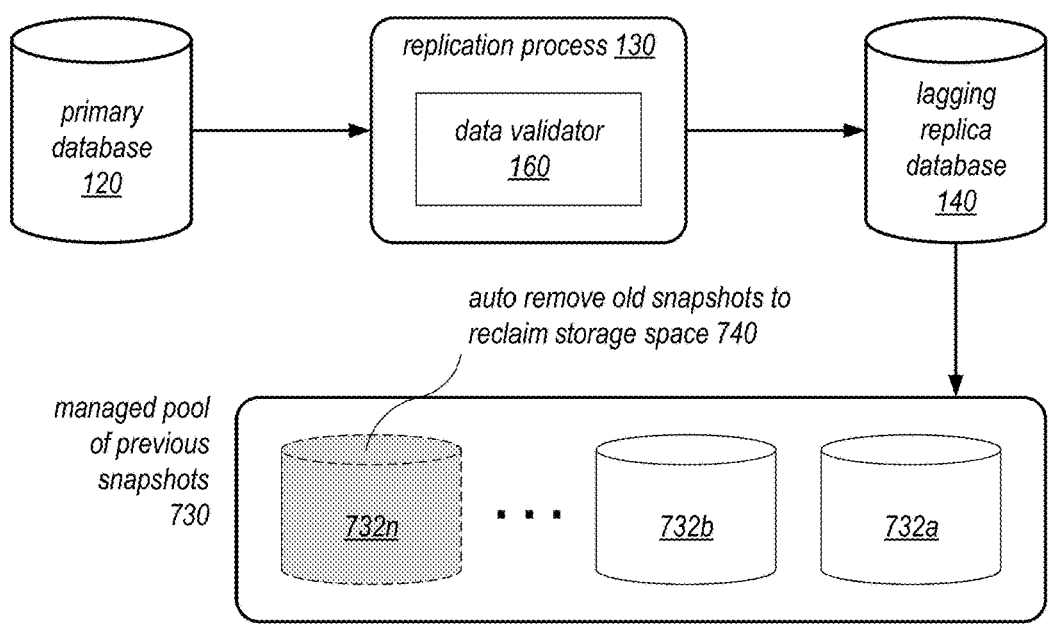

FIG. 7 illustrates a process of generating and managing snapshots of the lagging replica in a data validation system that validates data using the lagging replica.

As shown, the figure depicts the state of a primary database and its replica at three different times. In this example, the data validator 160 is implemented as part of the data replication process 130 (e.g., as part of the updater sender 132, update applier 136, or some other intermediary component of the database replication process. At time one, the data validator 160 has detected a validation failure, and has caused the replication process to halt. The halting of the replication process may occur as discussed in connection with FIG. 1.

At time two, after the replication process has halted, a snapshot 720 of the replica is created 710. The snapshot creation may be caused by the data validator 160, which may be able to invoke functionality of the database management system that manages the replica database. For example, the database management system may expose and call interface that allows clients such as data validator 160 to create snapshots. Note that because the halting has occurred before the problematic update was applied to the replica, the snapshot 720 represents a state of the replica before the problematic update. Subsequent to the snapshot 720, the replication process may resume on the replica database.

Thus, in the described manner, a possible validation failure of an update will cause only a short pause in the replication process. However, a snapshot or checkpoint of the data is taken before the possible invalid update, so that if the update is later proven or confirmed to be invalid, the replica database can be rolled back using the snapshot to a point before the problematic update. As an example, the snapshotting approach described here may be useful to detect potentially invalid updates (e.g. potentially fraudulent or unauthorized financial transactions). Such potentially invalid updates are checkpointed using the snapshots, but does not stop the ongoing update processing. However, the snapshots provide users the ability to more closely examine the updates at a later time, and roll back any updates or transactions that are confirmed to be invalid (e.g. by notifying the financial institution). In some embodiments, the data validator may be configured to automatically perform a number of actions upon a data validation failure, including generating a snapshot, generating or logging a user notification or alert, or automatically promoting the replica database to replace the primary and skipping the invalid update.

At time three, a number of snapshots 732a-n have been generated as a result of multiple validation failures. As discussed, each validation failure may cause a new checkpoint or snapshot to be generated. In some embodiments, these snapshots may be generated as a managed pool of previous snapshots 730. The data validation system may allow a user to select a particular snapshot to roll back to a desired point of the replica database. Additionally, the storing of the replica may be controlled so that if the storage space used by the replica exceeds a specified limit, older replicas may be automatically removed 740 to reclaim or make space available for new replicas. In this manner, the snapshotting process can continue to occur indefinitely without manual storage space management. In some embodiments, the automatic removal of snapshots may be a configurable feature of the data validation system, which may allow users to configure when to remove snapshots and how to select which snapshots to remove. For example, in some embodiments, each data validation may produce a confidence score or value that indicates the probability that a given update is invalid. In some embodiments, a data validation failure may be accompanied by a severity level of the potential corruption caused by the potentially invalid update. Such confidence or severity scores may be used to select snapshots for removal, so that snapshots generated for updates that are more likely to be invalid or updates causing more severe corruptions are retained in favor of other snapshots generated for less problematic updates.

Figure 8:
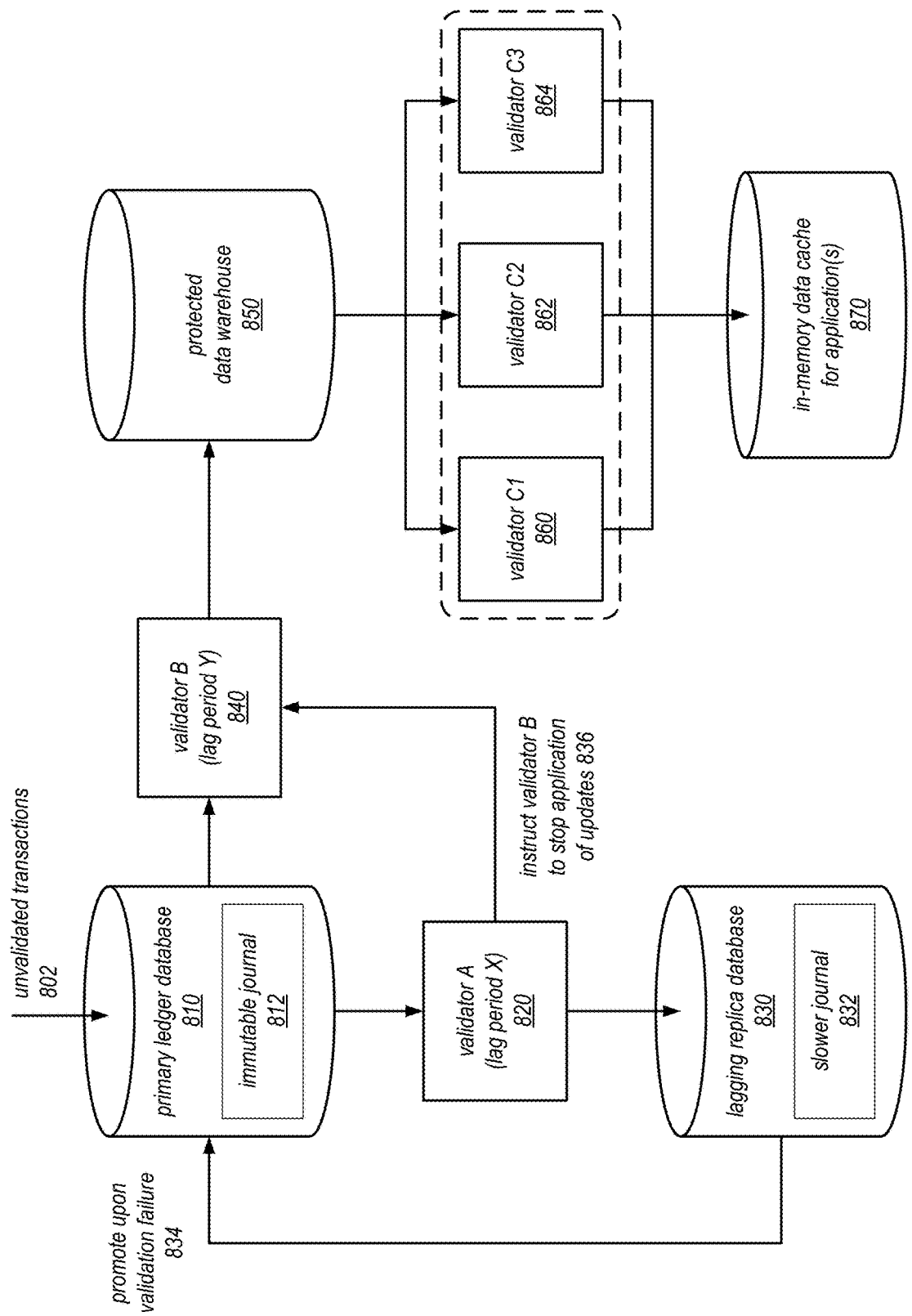
FIG. 8 illustrates multiple example uses of data validators between different types of database systems, according to some embodiments.

FIG. 8 illustrates multiple example uses of data validators between different types of database systems, according to some embodiments.

As shown, the figure depicts a number of linked databases 810, 830, 850, and 870 that implement a data flow. Databases 830, 850, and 870 are protected by data validators 820, 840, 860, 862, and 864 as shown, which are configured to prevent invalid data from propagating to these databases. As shown, the databases in this example include different types of databases (two ledger databases 810 and 830, a data warehouse 850, and an in-memory data cache 870). In some embodiments, the data validation system may be implemented as a distinct system from all of these database systems, and may be operable to work with all these types of database systems.

As shown, database 810 and 830 are ledger databases. In some embodiments, these ledger databases are configured to store not just a current state of the data, but also a journal 812 of all updates made to the data. In some embodiments, these journals 812 and 832 may be immutable in the sense that after a transaction or update has been appended to the journal, it can not be removed from the journal. In some embodiments, the journal may accomplish this cryptographically by requiring a new entry to the journal to include a hash computed from previous entries of the journal. Thus, if any entry of the journal is deleted, the deletion can be easily detected as a break in the chain of hashes. In some embodiments, this journal 812 may be used as the sequence of updates 134 to drive the replication process.

As shown, the primary database 810 receives unvalidated updates 802 and replicates the updates to a lagging replica database 830. Because database 830 is lagging, its journal 832 is slower than journal 812 of the primary database 810. As shown, the replication is controlled by a data validator A 820, which is configured to prevent invalid updates from being applied to the replica. Validator A may implement a superficial validation that can be completed relatively quickly, within lag period X (e.g. one minute). In this example, validator A may be further configured to promote 834 the replica database to replace the primary database in the event of a validation failure. Accordingly, the primary database 810 will be automatically cleansed of any problematic updates as soon as they are detected by validator A.

As shown, the primary database 810 has another secondary database (data warehouse 850), which is protected by validator B 840. Data warehouse 850 may not be maintained as a replica of the primary database 810. For example, data warehouse 850 may store only a portion of the data from the primary database 810, or receive updates from multiple primary databases. Validator B may be configured with a longer lag period Y (e.g. 10 minutes) than validator A. However, because the primary database 810 is quickly self-correcting (e.g. via the auto-promotion mechanism), data warehouse is also protected by validator A. As shown, validator A may also instruct 836 validator B to halt its replication process when validation failure occurs at validator A. This instruction may cause validator B to also discard all pending updates in its replication process in the last minute, and reobtain those updates from the newly promoted primary database. In some embodiments, multiple data validators may be logically composed in this manner to engineer a data flow where individual data replication links can be stopped and restarted by failure detections on other data links.

As shown, the data warehouse 850 provides data to another secondary database (the in-memory data cache 870), which is protected by three data validators C1 860, C2 862, and C3 866. These three validators may operate in tandem or in parallel, so that a detected validation failure on any of the three validators C1, C2, or C3 will cause updates to the data cache 870 to be halted. In some embodiments, a single data replication link may be protected by multiple data validators, as shown. In some embodiments, a single data validator may be attached to multiple data replication links.

Figure 9A:
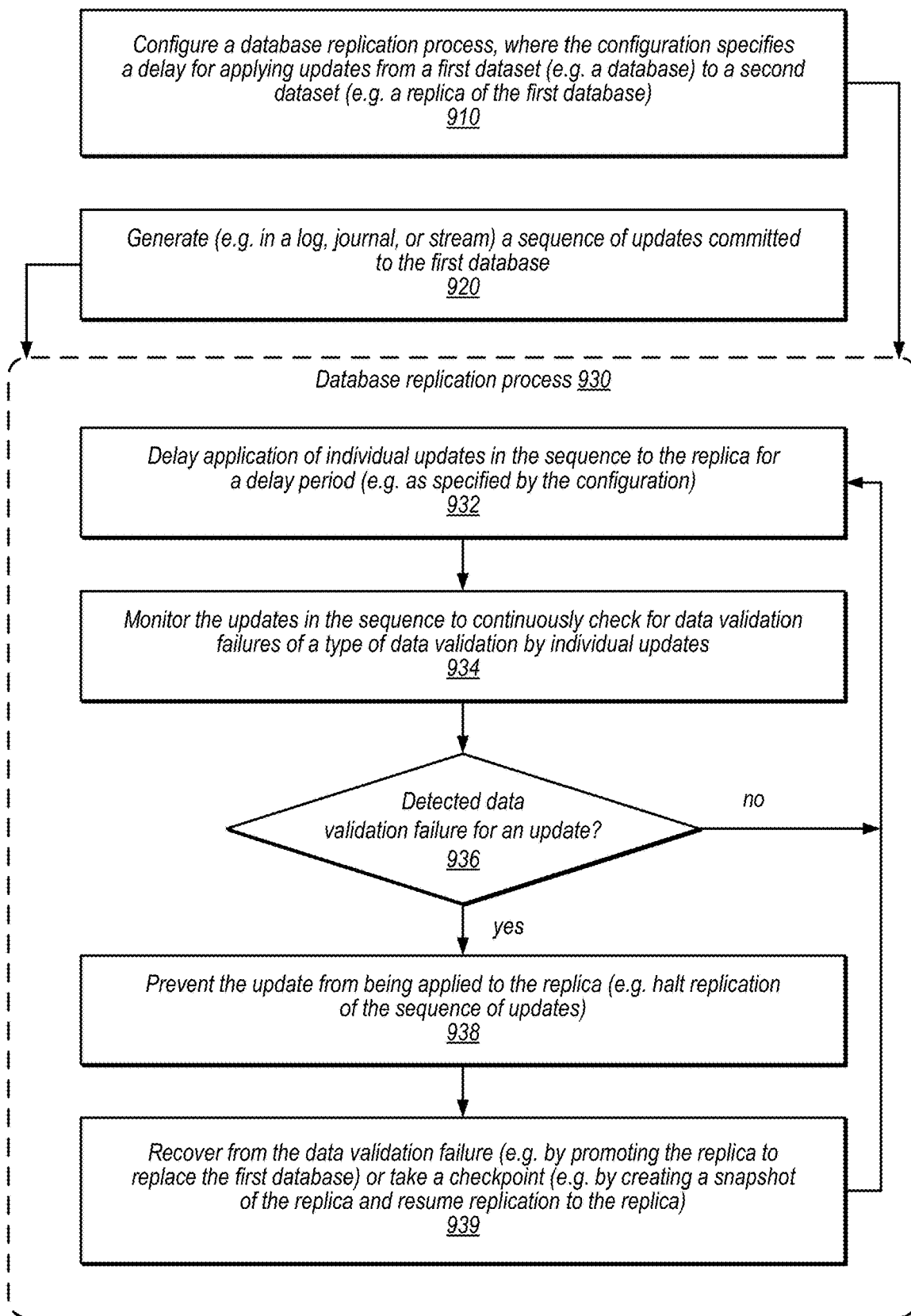
FIGS. 9A and 9B are flowcharts illustrating different aspects of the operations of a data validation system that uses a lagging replica, according to some embodiments.
Figure 9B:
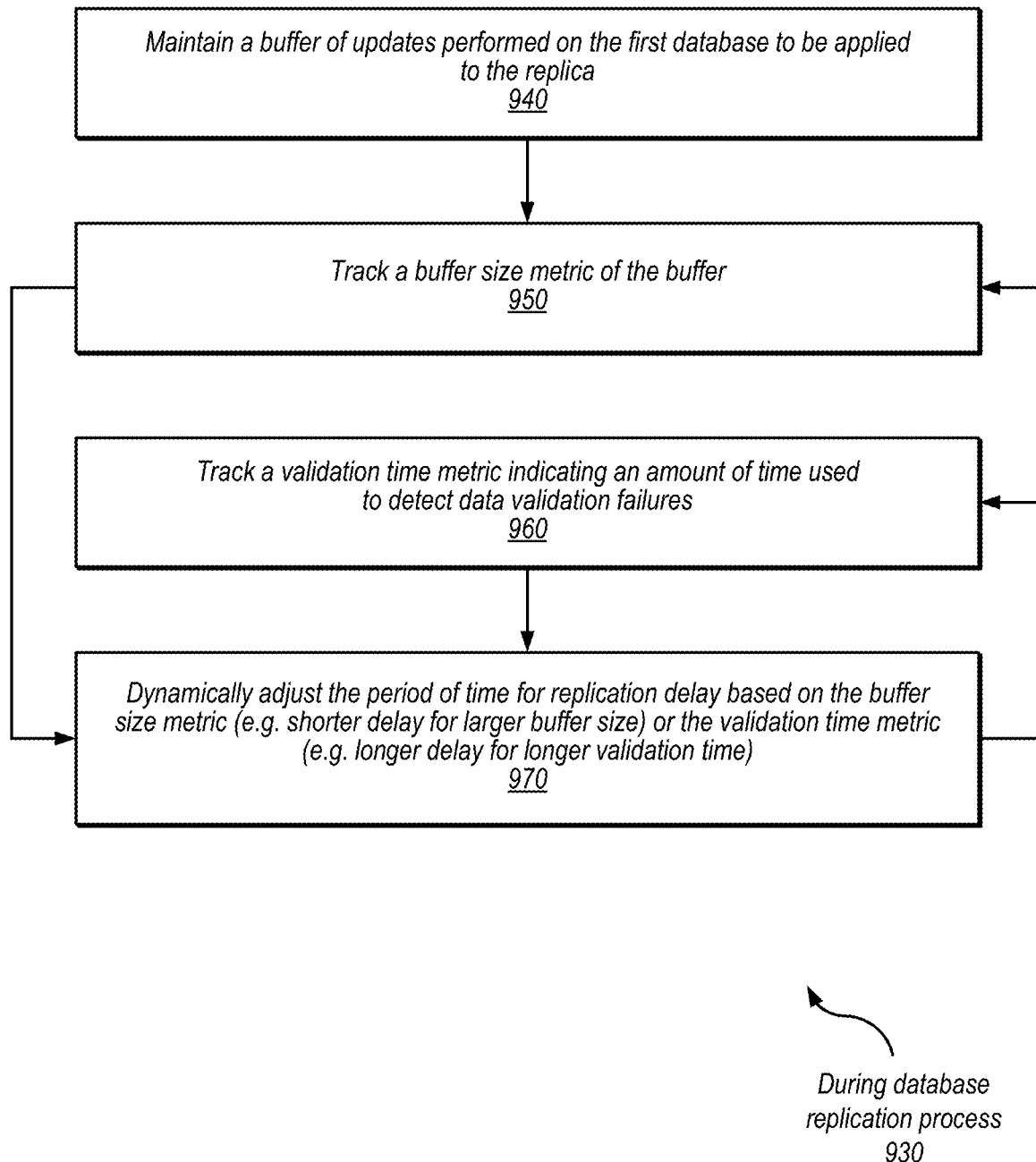

FIGS. 9A and 9B are flowcharts illustrating different aspects of the operations of a data validation system that uses a lagging replica, according to some embodiments.

FIG. 9A depicts an example process of configuring and operating a data validation system such as the data validation system 100 of FIG. 1. The process begins at operation 910, where a data replication process is configured. In some embodiments, the configuration information will specify a time delay (e.g. time delay 154) for applying updates from a first dataset (e.g. a primary database 120) to a second dataset (e.g. a replica 140 of the primary database). Depending on the embodiment, the data replication process may be implemented by a database management system managing the two databases, or in the data validation system separate from the database management system. In some embodiments, the configuration information may also specify a type of data validation to be performed on individual updates to be replicated in the data replication process. In some embodiments, the time delay will be sufficiently long to complete the data validation.

At operation 920, a sequence of updates committed to the first data is generated. For example, the sequence of updates may be the update sequence 134 of FIG. 1. In some embodiments, the sequence of updates may be generated to a transaction log or journal, which stores updates to the primary database in sequential order. The log or journal is then used to replicate the updates to the replica database. In some embodiments, the primary database may generate an update stream. Interested components (e.g. the update applier 136) may register to receive updates from the update stream and apply the updates in sequential order to maintain the replica database.

As shown, the next operations 932, 934, 936, 938, and 939 are all performed as part of the data replication process, according to the configuration of operation 910. The database replication process may be the replication process 130 of FIG. 1. At operation 932, application of individual updates from the first database to the replica is delayed for a delay period (e.g. as specified by the configuration). Depending on the embodiment, the delay may be implemented at the source database (e.g. by an update sender 132), at the destination database (e.g. by an update applier 136), or some intermediary component between the two databases. In some embodiments, the delay may not be configured, but simply reflect a latency in the replication caused by the data validator. As discussed, the delay period will provide enough time for the data validator 160 to detect validation failures in updates and prevent invalid updates from being replicated.

At operation 934, the updates in the sequence are monitored to check for data validation failures of one or more types of data validation (e.g. as specified by the configuration of operation 910) by individual updates. In some embodiments, the monitoring and detection may be performed by a component such as the data validator 160 of FIG. 1. The data validator may be inline to the replication process or internal to the database system, or an external validation system distinct from the database system. In some embodiments, the data validator may be implemented may be implemented on a provisioned compute node (e.g. a virtual machine instance) in a cloud-based service provider network. The data validator may be configured to perform a variety of data validations, including application-level validations, storage-level validations, blockchain validations, financial transaction validations, food taster validations, velocity check validations, among others.

At operation 936, a determination is made whether a data validation failure is detected for an update. For example, an invalid update may be detected if it fails a food taste validation, where a simulated client performs a simulated use of the data after it is updated. As another example, an invalid update may be detected if a velocity check validation is failed, where the amount of change in the data caused by the update (or recent updates) exceeds a threshold. If no data validation failure is detected, the process loops back to operation 932 to handle other updates. If a data validation failure is detected, the process proceeds to operation 938.

At operation 938, the update that failed the data validation is prevented from being applied to the replica database. In some embodiments, the prevention may be accomplished by halting the replication process from applying the invalid update and subsequent updates in the sequence. As discussed, operations 936 and 938 may all occur within a configured delay period for the lagging replica, so that any updates that fail the data validation are not propagated to the replica database. In some embodiments, the halting may be performed by a component such as the replication controller 166 of FIG. 1. In some embodiments, the data validator may initiate the halt via a control interface (e.g. replication control interface 132) of the database system that implements the replication process.

Operation 940 indicates two example actions that may be taken by the data validation system after the replication process is halted. In some embodiments, a recovery from the validation failure may be performed, for example, by promoting the replica database without the invalid update to replace the first (primary) database. In this manner, the data validation system can automatically correct the primary database to remove any invalid updates. In some embodiments, the data validation system may take a checkpoint, for example, by creating a snapshot of the replica database and then resume the replication process on the replica. In this manner, the replication process will only be stopped briefly to create the snapshot. However, the replica database can be reverted back to a point before the update (the snapshot) if it is later confirmed that the update is invalid. As shown, the process then loops back so that the replication process 930 is repeated for each update in the sequence.

FIG. 9B depicts a process of dynamically adjusting the delay timer period of the replica dataset in a data validation system. As shown, the depicted process will occur dynamically, without human intervention, during the database replication process 930 of FIG. 1.

Operations 940 and 950 illustrate the use of a buffer size metric to adjust the time delay. At operation 940, a buffer is maintained to store updates performed on the first database to be applied to the replica database. This buffer may be the update buffer 610 of FIG. 6, and be used to hold updates that are waiting to be validated. The buffer may be implemented by the data validator, or some component of the database replication process.

At operation 950, a buffer size metric of the buffer is tracked. The buffer size metric may be metric 632 of FIG. 6, and the tracking may be performed by a component such as buffer size tracker 630. In some embodiments, multiple buffer size metrics may be monitored and used for the time delay adjustment.

At operation 960, a validation time metric is tracked. The validation time metric indicates an amount of time used to detect data validation failures, and may be metric 642 of FIG. 6. In some embodiments, the tracking may be performed by a component such as the validation time tracker 640 of FIG. 6. In some embodiments, the validation time metric may be determined by observing an external validator over a period of time.

At operation 970, the period of time for the replication delay is dynamically adjusted based on either the buffer size metric, the validation time metric, or both. In some embodiments, the dynamic adjustment may be performed by the adjustment component 650 of FIG. 6. In some embodiments, the time delay adjustor may decrease the time delay for larger values of the buffer size metric. In some embodiments, the time delay adjustor may increase the time delay for larger values of the validation time metric. In some embodiments, the automatic adjustments may be controlled by configuration information, and may include a number of additional runtime conditions or metrics.

Figure 10:
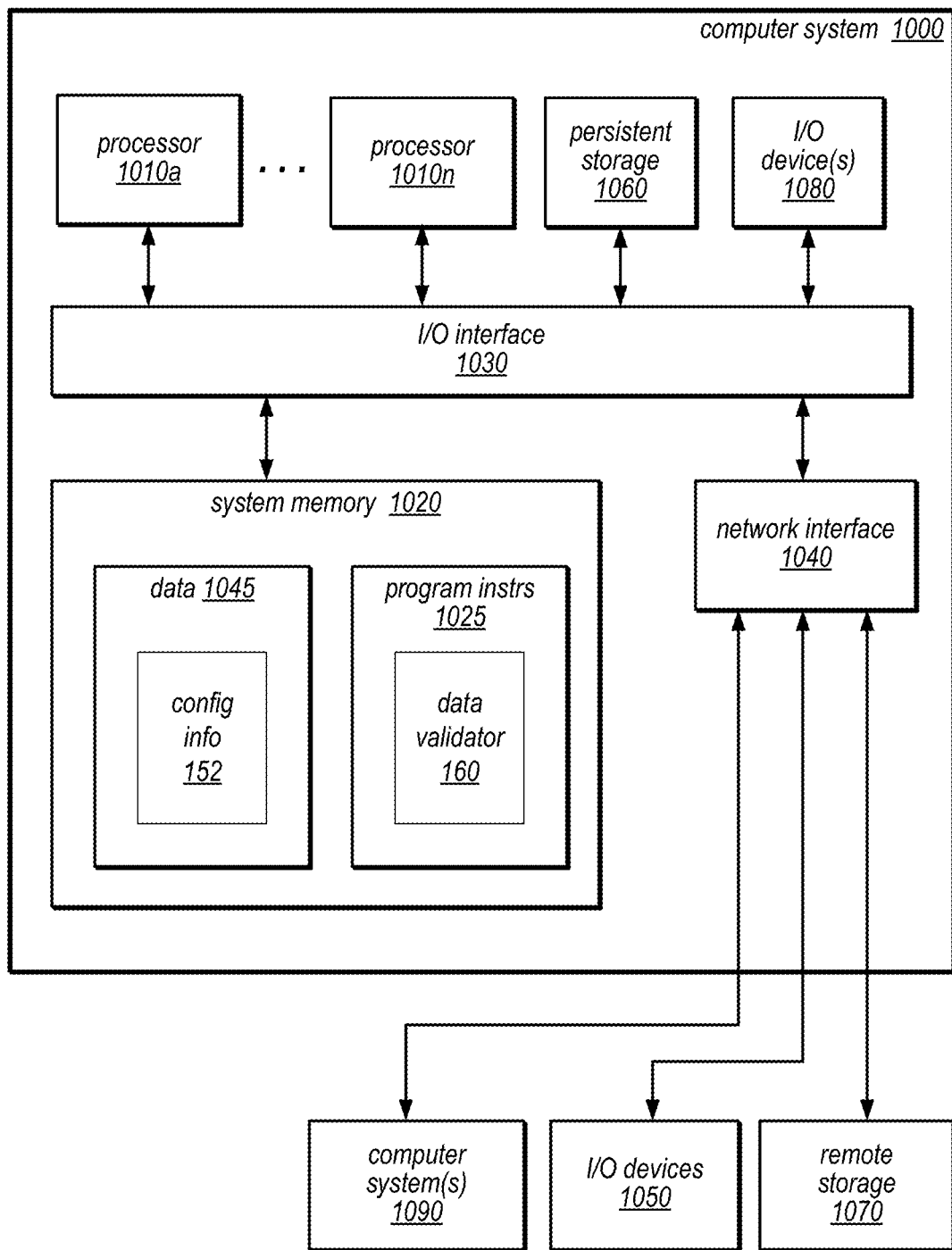
FIG. 10 is a block diagram illustrating an example computer system that can be used to implement one or more portions of a data validation system that implements real-time data validation using a lagging replica, according to some embodiments.

FIG. 10 is a block diagram illustrating an example computer system that can be used to implement one or more portions of a data validation system that implements real-time data validation using a lagging replica, according to some embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that may store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. For example, the program instructions 1025 may implement portions of the data validator 160, as discussed in connection with FIG. 1. In various embodiments, program instructions 1025 may be encoded in platform native binary, any interpreted language such as Java™ byte-code, or in any other language such as C/C++, Java™, etc., or in any combination thereof. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be used to store data used by the program instructions. For example, the data store 1045 may be used to store configuration information 152 for a data validator, as discussed in connection with FIG. 1. For example, the data may include other data stored by the database tier (e.g., on a primary node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Along those lines, the information described herein as being stored by a read replica, such as various data records stored in a cache of the read replica, in-memory data structures, manifest data structures, and/or other information used in performing the functions of the read-only nodes described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, data pages, data records, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, primary nodes, read-only node nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   one or more hardware processors and associated memory storing program instructions executable by the one or more hardware processors to implement a database system configured to:
   execute a database replication process from a first database to a second database, wherein the database replication process is configured to:
   (a) delay updates of the first database from being applied to the second database for a delay period; and
   (b) prevent an update of the first database from being applied to the second database responsive to a data validation failure for the update detected during the delay period;
   maintain a buffer of updates performed on the first database waiting to be validated and applied to the second database;
   track a buffer size metric of the buffer indicating an amount of updates in the buffer waiting to be validated;
   track a validation time metric indicating an amount of time used to detect data validation failures; and
   dynamically adjust the delay period based at least in part on the buffer size metric and the validation time metric.

2. The system of claim 1, wherein the database system is configured to:
   dynamically decrease the delay period for one or more increasing values of the buffer size metric; and
   dynamically increase the delay period for one or more increasing values of the validation time metric.

3. The system of claim 2, wherein the database system is configured to:
   in conjunction with decreasing the delay period, increase a number of validator instances according to an auto-scaling mechanism.

4. The system of claim 1, wherein the buffer size metric comprises one or more of:
   a number of updates currently in the buffer,
   a number of updates in the buffer in a previous time window,
   a number of updates entering or exiting the buffer,
   an amount of storage space used by the buffer,
   an amount of data entering or exiting the buffer,
   a rate of change of a number of updates in the buffer,
   a predicted number of updates in the buffer for a next time period, and
   a predicted amount of storage space used by the buffer for a next time period.

5. The system of claim 1, wherein the validation time metric is measured for an external data validator that is remote from the database system.

6. The system of claim 5, wherein the external data validator is a blockchain validator in a blockchain system.

7. The system of claim 1, wherein the validation time metric comprises one or more of:
   an average time to receive validations in a last time period,
   a trend or rate of change in validation times, and
   a measure of a validating performing data validation checks.

8. The system of claim 1, wherein the dynamic adjustments of the delay period is controlled by one or more user-configured policies, rules, or settings.

9. The system of claim 1, wherein the database system is configured to, after the data validation failure is detected:
   halt the database replication process; and
   promote the second database to replace the first database.

10. The system of claim 1, wherein the database system is configured to, after the data validation failure is detected:
    create a snapshot of the second database as a checkpoint; and
    resume the database replication process.

11. A method, comprising:
    executing a database system implemented by one or more hardware processors with associated memory, including:

executing a database replication process from a first database to a second database, wherein the database replication process includes:
(a) delaying updates of the first database from being applied to the second database for a delay period; and
(b) preventing an update of the first database from being applied to the second database responsive to a data validation failure for the update detected during the delay period;
maintaining a buffer of updates performed on the first database waiting to be validated and applied to the second database;
tracking a buffer size metric of the buffer indicating an amount of updates in the buffer waiting to be validated;
tracking a validation time metric indicating an amount of time used to detect data validation failures; and
dynamically adjusting the delay period based at least in part on the buffer size metric and the validation time metric.

12. The method of claim 11, further comprising the database system:
dynamically decreasing the delay period for one or more increasing values of the buffer size metric; and
dynamically increasing the delay period for one or more increasing values of the validation time metric.

13. The method of claim 12, further comprising the database system:
in conjunction with decreasing the delay period, increasing a number of validator instances according to an auto-scaling mechanism.

14. The method of claim 11, wherein the buffer size metric comprises one or more of:
a number of updates currently in the buffer,
a number of updates in the buffer in a previous time window,
a number of updates entering or exiting the buffer,
an amount of storage space used by the buffer,
an amount of data entering or exiting the buffer,
a rate of change of a number of updates in the buffer,
a predicted number of updates in the buffer for a next time period, and
a predicted amount of storage space used by the buffer for a next time period.

15. The method of claim 11, wherein the validation time metric is measured for an external data validator that is remote from the database system.

16. The method of claim 15, wherein the external data validator is a blockchain validator in a blockchain system.

17. The method of claim 11, wherein the validation time metric comprises one or more of:
an average time to receive validations in a last time period,
a trend or rate of change in validation times, and
a measure of a validating performing data validation checks.

18. The method of claim 11, wherein the dynamic adjustments of the delay period is controlled by one or more user-configured policies, rules, or settings.

19. The method of claim 11, further comprising the database system,
after detecting the data validation failure is detected:
halting the database replication process; and
promoting the second database to replace the first database.

20. The method of claim 11, further comprising the database system,
after detecting the data validation failure:
creating a snapshot of the second database as a checkpoint; and
resuming the database replication process.

* * * * *